United States Patent
Zhang et al.

(10) Patent No.: US 11,929,814 B2
(45) Date of Patent: Mar. 12, 2024

(54) BEAMFORMING BASED ON VIRTUAL IMAGES

(71) Applicant: QUALCOMM Incorporated, San Diego, CA (US)

(72) Inventors: Danlu Zhang, San Diego, CA (US); Yu Zhang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/810,789

(22) Filed: Jul. 5, 2022

(65) Prior Publication Data

US 2024/0014882 A1 Jan. 11, 2024

(51) Int. Cl.
*H04B 7/08* (2006.01)
*H01Q 15/02* (2006.01)
*H04B 7/0426* (2017.01)
*H04B 7/06* (2006.01)

(52) U.S. Cl.
CPC ............ *H04B 7/086* (2013.01); *H01Q 15/02* (2013.01); *H04B 7/043* (2013.01); *H04B 7/0617* (2013.01)

(58) Field of Classification Search
CPC ...... H04B 7/086; H04B 7/043; H04B 7/0617; H01Q 15/02
See application file for complete search history.

(56) References Cited

U.S. PATENT DOCUMENTS

| 10,624,612 B2 | 4/2020 | Sumi et al. | |
|---|---|---|---|
| 2014/0062762 A1* | 3/2014 | Kurono | G01S 7/354 342/146 |
| 2022/0321198 A1* | 10/2022 | Devoti | H04W 16/28 |

OTHER PUBLICATIONS

Assimonis S.D., et al., "Millimeter-Wave Multimode Circular Array for Spatially Encoded Beamforming in a Wide Coverage Area", arXiv:2101.05213v1 [eess.SP] Dec. 29, 2020, 2021 15th European Conference on Antennas and Propagation (EUCAP), EURAAP, Mar. 22, 2021, pp. 1-4, pp. 1-6, XP033907904.
Bernard C., et al., "Wideband Time Reversal Processing for Ultrasound NDE Imaging", Ultrasonics Symposium (IUS), 2011 IEEE International, IEEE, Oct. 18, 2011, pp. 507-511, XP032230831.
Giordani M., et al., "Comparative Analysis of Initial Access Techniques in 5G mmWave Cellular Networks", arXiv:1605.00101v1 [cs.NI] Apr. 30, 2016, ArXiv.Org, Cornell University Library, 201 Olin Library Cornell University Ithaca, NY 14853, Apr. 30, 2016, XP081359304, 6 Pages.
International Search Report and Written Opinion—PCT/US2023/019564—ISA/EPO—dated Jul. 24, 2023.

* cited by examiner

*Primary Examiner* — Vineeta S Panwalkar
(74) *Attorney, Agent, or Firm* — Harrity & Harrity, LLP

(57) ABSTRACT

Various aspects of the present disclosure generally relate to wireless communication. In some aspects, a network node may determine a reference location associated with a virtual image corresponding to a target area. The network node may transmit a radio frequency signal, wherein the radio frequency signal is beamformed based at least in part on the reference location to direct the radio frequency signal to the target area. Numerous other aspects are described.

30 Claims, 10 Drawing Sheets

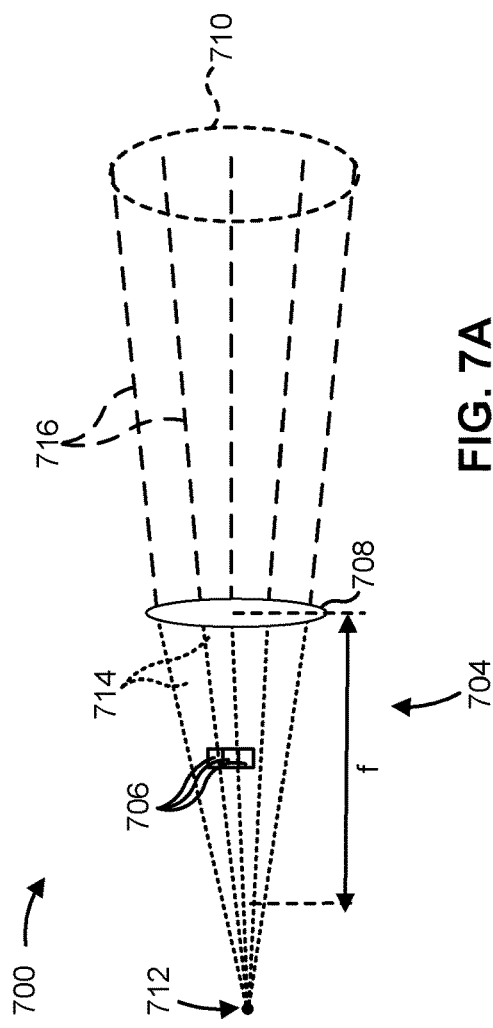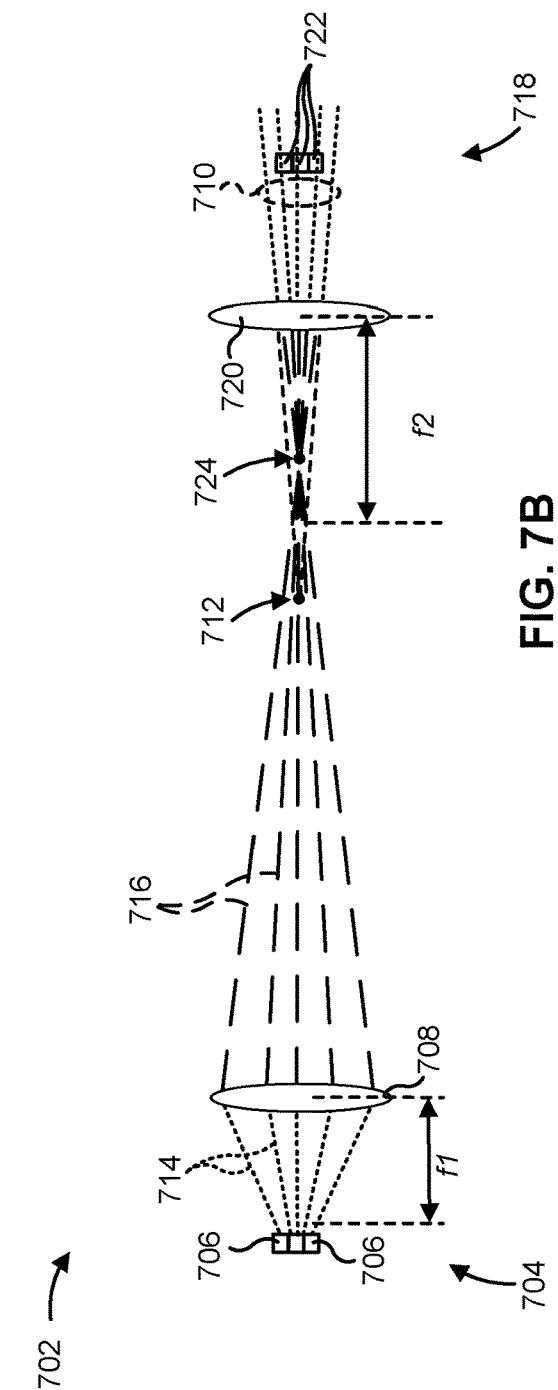
FIG. 7A
FIG. 7B

BEAMFORMING BASED ON VIRTUAL IMAGES

FIELD OF THE DISCLOSURE

Aspects of the present disclosure generally relate to wireless communication and to techniques and apparatuses for beamforming based on virtual images.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network node for wireless communication. The network node may include a memory and one or more processors coupled to the memory. The one or more processors may be configured to determine a reference location associated with a virtual image corresponding to a target area. The one or more processors may be configured to transmit a radio frequency signal, wherein the radio frequency signal is beamformed based at least in part on the reference location to direct the radio frequency signal to the target area.

Some aspects described herein relate to a network node for wireless communication. The network node may include a memory and one or more processors coupled to the memory. The one or more processors may be configured to determine a reference location associated with a virtual image corresponding to a target area. The one or more processors may be configured to receive a radio frequency signal using a reception beam that is beamformed based at least in part on the reference location.

Some aspects described herein relate to a method of wireless communication performed by a network node. The method may include determining a reference location associated with a virtual image corresponding to a target area. The method may include transmitting a radio frequency signal, wherein the radio frequency signal is beamformed based at least in part on the reference location to direct the radio frequency signal to the target area.

Some aspects described herein relate to a method of wireless communication performed by a network node. The method may include determining a reference location associated with a virtual image corresponding to a target area. The method may include receiving a radio frequency signal using a reception beam that is beamformed based at least in part on the reference location.

Some aspects described herein relate to a non-transitory computer-readable medium that stores a set of instructions for wireless communication by a network node. The set of instructions, when executed by one or more processors of the network node, may cause the network node to determine a reference location associated with a virtual image corresponding to a target area. The set of instructions, when executed by one or more processors of the network node, may cause the network node to transmit a radio frequency signal, wherein the radio frequency signal is beamformed based at least in part on the reference location to direct the radio frequency signal to the target area.

Some aspects described herein relate to a non-transitory computer-readable medium that stores a set of instructions for wireless communication by a network node. The set of instructions, when executed by one or more processors of the network node, may cause the network node to determine a reference location associated with a virtual image corresponding to a target area. The set of instructions, when executed by one or more processors of the network node, may cause the network node to receive a radio frequency signal using a reception beam that is beamformed based at least in part on the reference location.

Some aspects described herein relate to an apparatus for wireless communication. The apparatus may include means for determining a reference location associated with a virtual image corresponding to a target area. The apparatus may include means for transmitting a radio frequency signal, wherein the radio frequency signal is beamformed based at least in part on the reference location to direct the radio frequency signal to the target area.

Some aspects described herein relate to an apparatus for wireless communication. The apparatus may include means for determining a reference location associated with a virtual image corresponding to a target area. The apparatus may include means for receiving a radio frequency signal using a reception beam that is beamformed based at least in part on the reference location.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5, 6A, 6B, 7A, and 7B are diagrams illustrating examples associated with beamforming based on virtual images, in accordance with the present disclosure.

DETAILED DESCRIPTION

Figure 1:
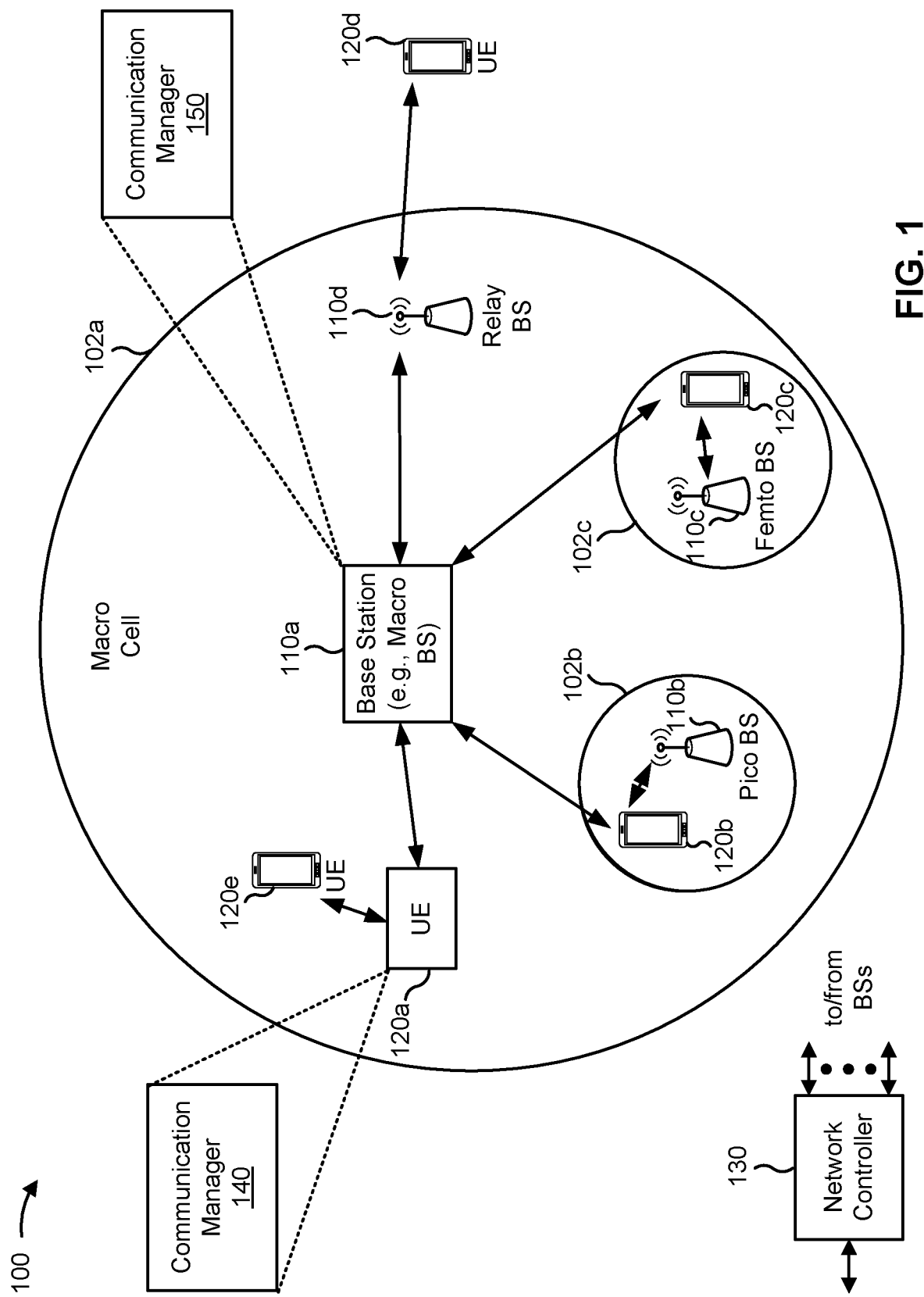
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a network node may include a communication manager 140 or a communication manager 150. As described in more detail elsewhere herein, the communication manager 140 or 150 may determine a reference location associated with a virtual image corresponding to a target area; and transmit a radio frequency signal, wherein the radio frequency signal is beamformed based at least in part on the reference location to direct the radio frequency signal to the target area. In some aspects, the communication manager 140 or 150 may determine a reference location associated with a virtual image corresponding to a target area; and receive a radio frequency signal using a reception beam that is beamformed based at least in part on the reference location. Additionally, or alternatively, the communication manager 140 or 150 may perform one or more other operations described herein.

As indicated above, FIG. 1 is provided as an example. Other examples may differ from what is described with regard to FIG. 1.

Figure 2:
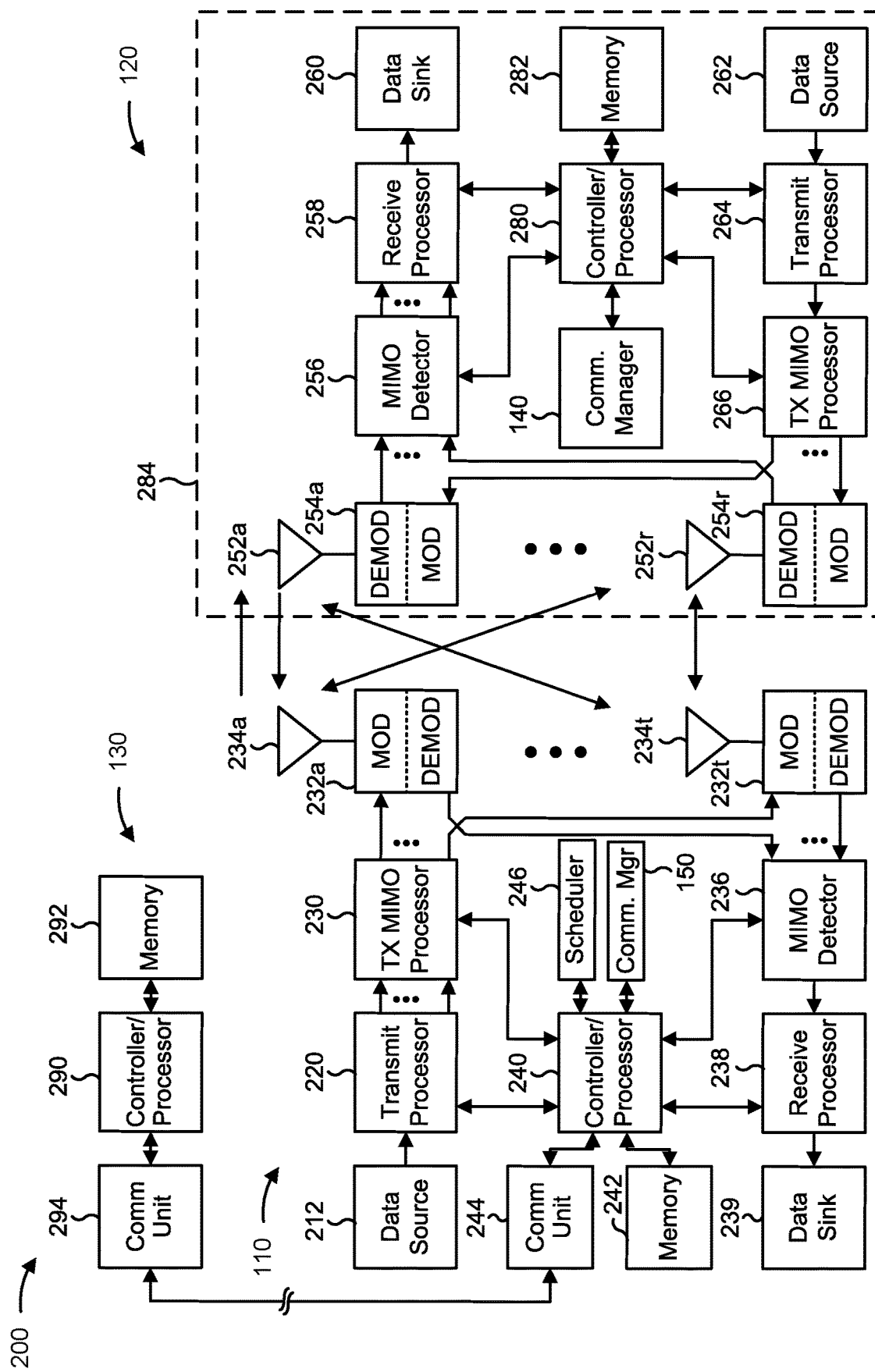
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with beamforming based on virtual images, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node includes means for determining a reference location associated with a virtual image corresponding to a target area; and/or means for transmitting a radio frequency signal, wherein the radio frequency signal is beamformed based at least in part on the reference location to direct the radio frequency signal to the target area. In some aspects, the network node includes means for determining a reference location associated with a virtual image corresponding to a target area; and/or means for receiving a radio frequency signal using a reception beam that is beamformed based at least in part on the reference location. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
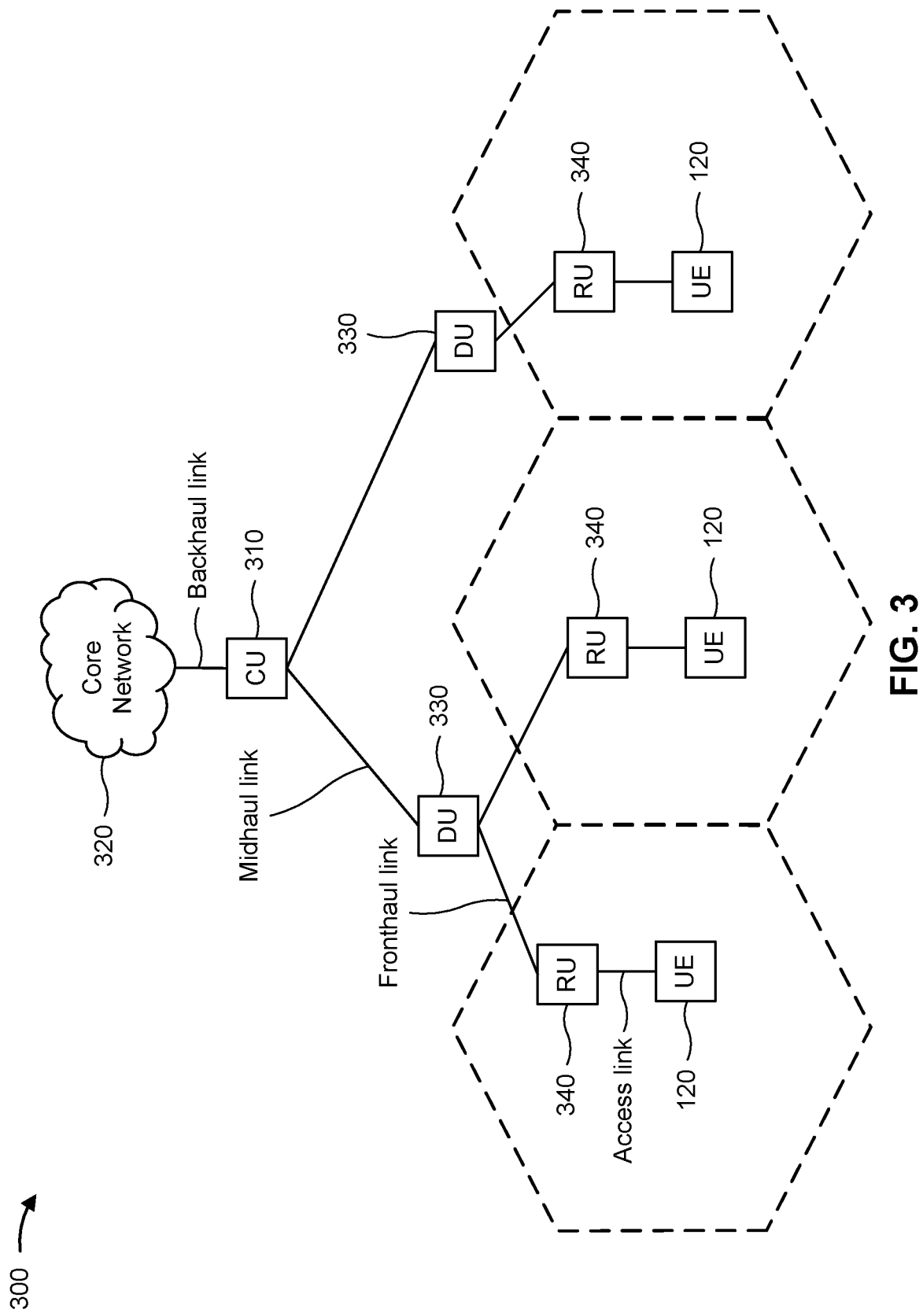
FIG. 3 is a diagram illustrating an example of an open-radio access network architecture, in accordance with the present disclosure.

FIG. 3 is a diagram illustrating an example 300 of an open-radio access network (O-RAN) architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host radio frequency processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
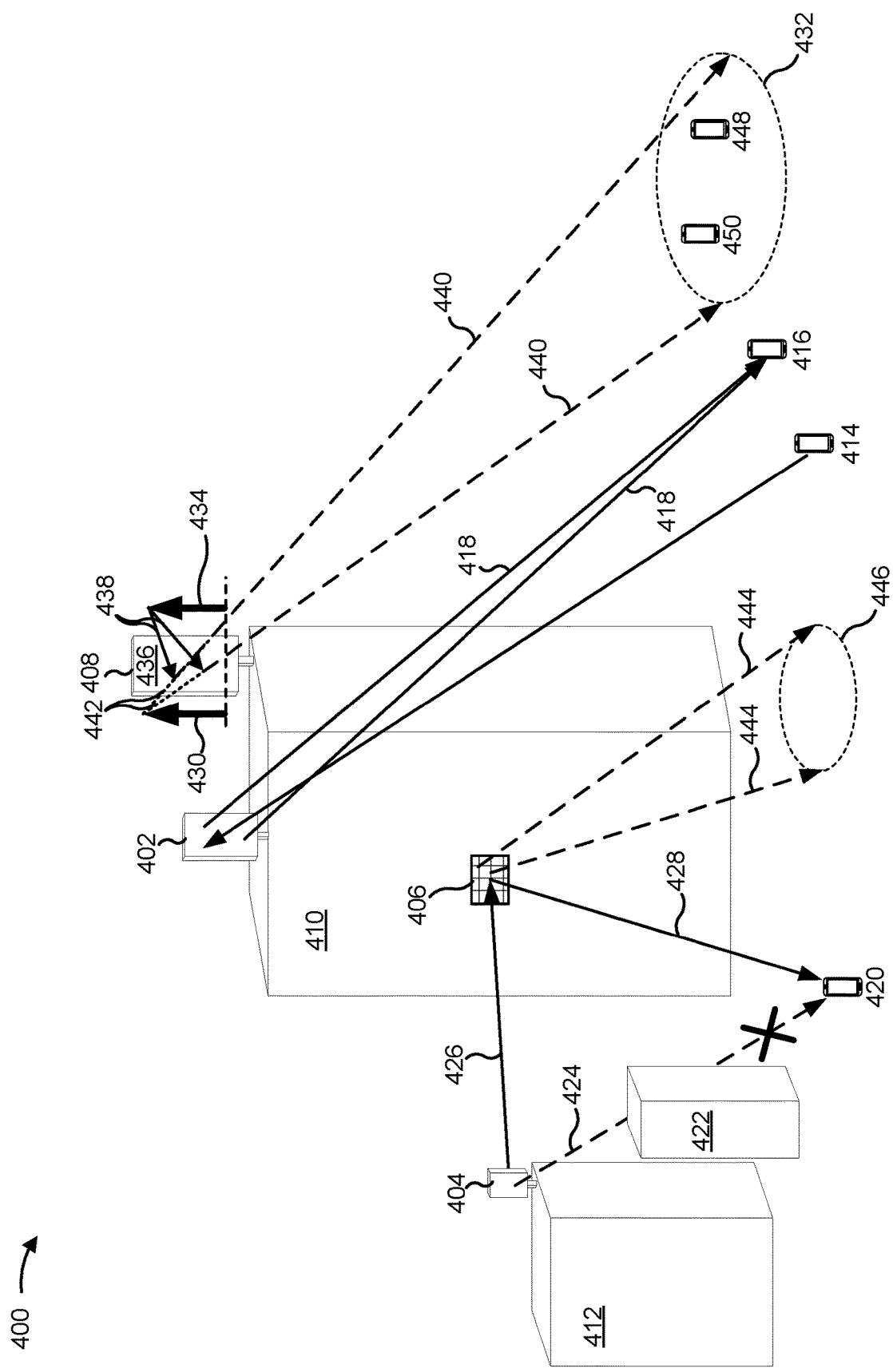
FIG. 4 is a diagram illustrating an example of multiple input multiple output (MIMO) communications, in accordance with the present disclosure.

FIG. 4 is a diagram illustrating an example 400 of MIMO communications, in accordance with the present disclosure. As shown, the example 400 includes a number of network nodes 402, 404, 406, and 408. The network nodes 402, 406, and 408 are depicted as being mounted on a building 410, and the network node 404 is depicted as being mounted on a building 412. In some cases, one or more of the network nodes 402, 404, 406, and/or 408 may include any number of different types of network nodes such as, for example, base stations, relay devices, DUs, RUs, CUs, and/or UEs, among other examples, and may be self-contained, integrated with any number of other different structures and/or devices, and/or mounted on any number of different types of structures (e.g., vehicles, poles, and/or non-terrestrial network devices, among other examples).

As shown, for example, the network node 402 may communicate with a network node 414 (e.g., a UE) and a network node 416 (e.g., a UE). In some cases, for example, the network node 402 can include an antenna panel configured for MIMO communications, in which case the network node 402 can communicate with the network node 414 and the network node 416 simultaneously. In some cases, multiple antenna elements of the antenna panel can be configured to direct a beam 418 to the network node 416. Because MIMO antenna panels include multiple antenna elements, the beam 418 can be beamformed so as to be directed to a target (e.g., the network node 416) a certain distance away from the network node 402.

As shown, the network node 404 can communicate with a network node 420. In some cases, an obstruction 422 can block a line-of-sight (LoS) communication 424 (as indicated by the "X" over the communication 424 arrow) between the network node 404 and the network node 420. To facilitate communication with the network node 420, the network node 404 can utilize the network node 406, which can be, for example, a reconfigurable intelligent surface (RIS) (which also can be referred to as an intelligent reflective surface (IRS)). As shown, for example, the network node 404 can transmit a signal 426 toward the network node 406, which can reflect a reflected signal 428 to the network node 420. In some cases, the network node 406 can include an RIS panel that has multiple reflective radio frequency (RF) reflective elements so that the reflected signal 428 can be beamformed to be directed specifically at the network node 420.

Advanced MIMO schemes such as those depicted in FIG. 4 can include any number of different types of MIMO schemes such as, for example, RIS MIMO, holographic MIMO, orbital angular momentum (OAM) MIMO, LoS MIMO, and/or lens-MIMO, among other examples. As indicated above, these MIMO schemes can be designed to focus radio energy from a large aperture (as compared to wavelength) to a specific point or direction. This type of focusing enables sharp focus of signals, thereby improving data rate. However, due to the very limited size of the footprint of the focused signal, this type of beamforming can significantly increase the complexity involved in device discovery, as the network node would have to sweep the focused beam over an area much larger than the signal's footprint. As a result, MIMO beamforming can reduce mobility support and initial system acquisition, thereby having a negative impact on network performance.

In some cases, a solution can be to include an additional, specialized antenna that is configured for high transmit power and/or transmitting at a broad angle. However, this solution increases power consumption and device complexity. In some cases, a solution can be to partition a transmitter antenna panel into sub-panels, each of which can transmit a signal in a different direction. However, this solution can increase system complexity, as an elaborate partitioning can be needed to cover both angular and depth domains. Moreover, signals from the multiple antenna panels of the different partitions can interfere with one another. One solution can be to decrease the size of the aperture (e.g., the size of the effective surface from which a signal is transmitted). However, in many cases, advanced MIMO systems include large antenna panels and introducing a smaller aperture can result in device and computation complexity.

The solution of using a smaller aperture can arise from a common interpretation of the uncertainty principle in which the uncertainty principle is interpreted as implying that a large aperture necessarily results in sharp and narrow focus. However, the inventors have discovered that this common interpretation is actually a misconception. Instead, the inventors have determined that a more accurate interpretation of the uncertainty principle indicates that the uncertainty principle only dictates a lower bound on the product of signal spread in the object plane (aperture size) and the signal spread (signal focus) on the image plane (reception plane). Thus, the uncertainty principle does not rule out the possibility of achieving a large energy spread with a large aperture.

Some aspects of the techniques and apparatuses described herein may utilize the more accurate interpretation of the uncertainty principle described above to facilitate targeting a larger region with MIMO beams transmitted by (or received by) a MIMO system having a relatively large aperture. In some aspects, a network node may determine a reference location associated with a virtual image corresponding to a target area and transmit a radio frequency signal, where the radio frequency signal is beamformed based at least in part on the reference location to direct the radio frequency signal to the target area. The reference location may be determined based at least in part on a desired target area range (e.g., distance from the aperture). The concept of the virtual image is the same as in optics where a virtual image is formed behind a mirror by tracing back diverging light beams. In some aspects, the large aperture of a MIMO scheme implemented at the network node may facilitate providing a virtual image that is similar to a point source. In some aspects, the virtual image may be formed based at least in part on appropriate phase terms on the antenna (or reflective) array. In some aspects, the network node may include a lens, in which case the virtual image may be formed based at least in part on a geometric configuration and/or orientation of the lens.

As shown in FIG. 4, for example, the network node 408 may determine a reference location associated with a virtual image 430 corresponding to a target area 432. Based on radio frequency optics principles, the virtual image 430 may be formed based at least in part on an image 434 that may be oriented with respect to an aperture of the antenna panel 436 of the network node 408 so that, conceptually, radio frequency energy rays 438 originating at the image 434 would reflect off of the panel 436 and create conceptualized reflected radio frequency rays 440 that correspond to the target area 432. Virtual ray portions 442 may be determined based on the conceptualized reflected radio frequency rays 440 so that the virtual ray portions 442 originate at the virtual image 430, which may approximate a point source of the radio frequency energy for the resulting beam, which may be transmitted in a direction corresponding to the direction of the conceptualized reflected radio frequency rays 440. Similarly, an RIS such as the network node 406 may use reflective elements to reflect the transmitted signal 426 based at least in part on a determined reference location of a virtual image to cause a reflected signal 444 to cover a target area 446.

In this manner, some aspects may facilitate providing a broad coverage area (e.g., the target area 432 and/or the target area 446) so that multiple network nodes 448 and 450 (or a single network node at multiple locations) may be discoverable via the transmission. The broad coverage may provide uniform signal strength across a designated area (e.g., the target area 432 and/or the target area 446) where the signal strength is sufficient for device discovery, system information broadcasting, synchronization, and/or random access reception, among other examples. In this way, some aspects may facilitate improved system acquisition and mobility, thereby having a positive impact on network performance.

As indicated above, FIG. 4 is provided as an example. Other examples may differ from what is described with regard to FIG. 4.

Figure 5:
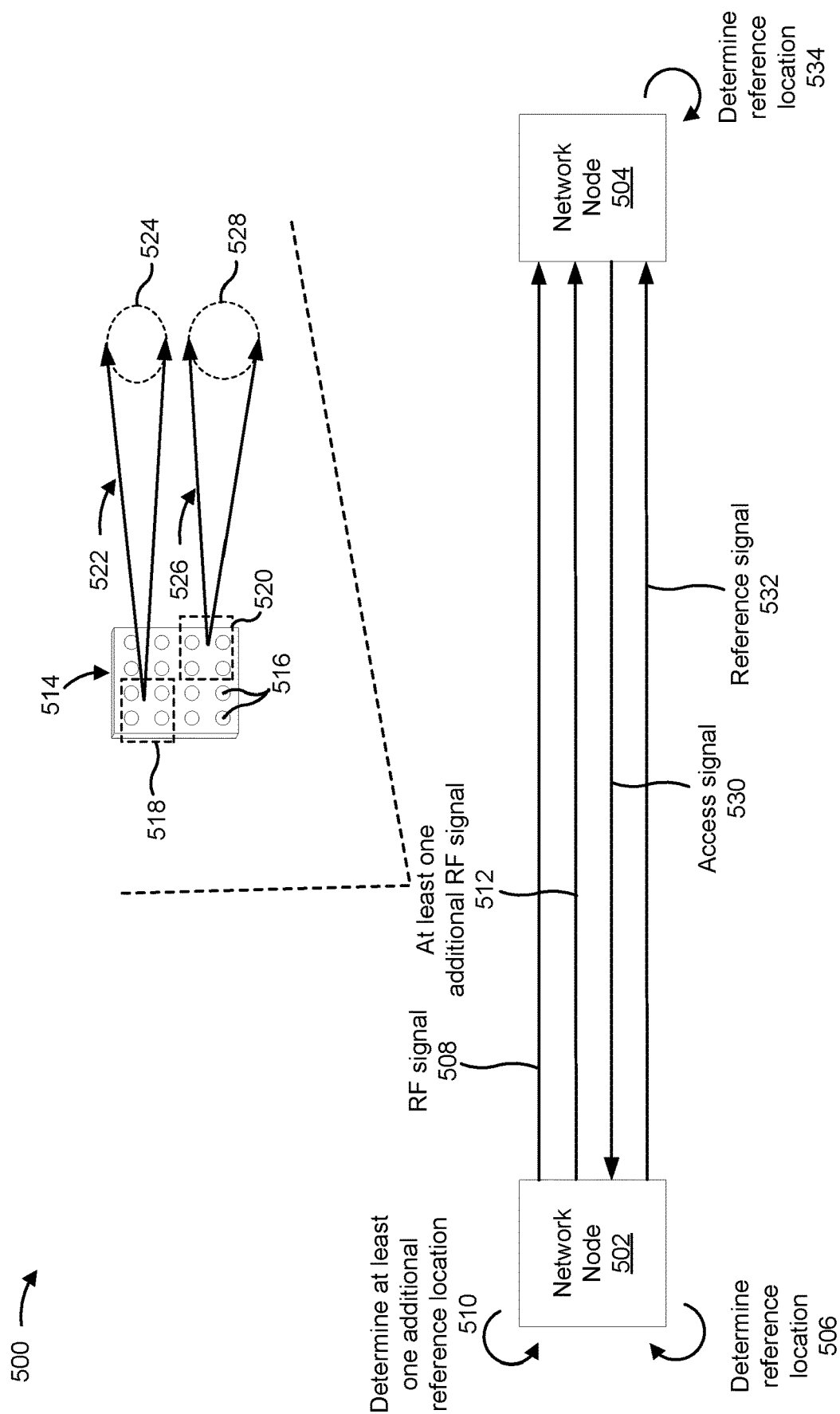

FIG. 5 is a diagram illustrating an example 500 associated with beamforming based on virtual images, in accordance with the present disclosure. As shown, a network node 502 and a network node 504 may communicate with one another. In some aspects, for example, the network node 502 and/or the network node 504 may be, be similar to, include, or be included in, one or more of the network nodes 408 and 406 depicted in FIG. 4. In some aspects, for example, the network node 502 and/or the network node 504 may be, be similar to, include, or be included in, a base station, a relay device, a repeater, an RIS, and/or a UE, among other examples. In some aspects, the network node 502 and/or the network node 504 may include an antenna system having a MIMO configuration.

As shown by reference number 506, the network node 502 may determine a reference location associated with a virtual image corresponding to a target area. In some aspects, the virtual image may include a virtual point source for the radio frequency signal. In some aspects, the virtual image may correspond to a point spread function associated with an aperture of an antenna panel of the network node 502. The network node 502 may determine the reference location based at least in part on determining a source signal distribution associated with the radio frequency signal at the reference location. In some aspects, the reference location may be based at least in part on a range associated with the target area.

As shown by reference number 508, the network node 502 may transmit a radio frequency signal. The radio frequency signal may be beamformed based at least in part on the reference location to direct the radio frequency signal to the target area. In some aspects, the radio frequency signal may include at least one of a system broadcast signal, a synchronization signal, or a reference signal. The network node 502 may transmit the radio frequency signal by beamforming the radio frequency signal based at least in part on at least one of a phase adjustment corresponding to an antenna element of a phased array or a geometric configuration of a lens associated with an antenna system of the network node 502.

In some aspects, the finite aperture of the transmitter panel of the network node 502 may imply that the virtual image is not a single dot, but is, instead, the Fourier transform of the aperture function, or the point spread function (PSF). With discrete antenna elements on the panel, a sampling effect also may be present. The envelope of the PSF may be related to the unit range for each antenna element, and multiple peaks in the PSF may be due to sampling. In some aspects, the antenna panel may include dense antenna elements, thereby reducing the presence of side peaks in the PSF. However, as dense antennas may lead to correlation across antennas, in some aspects, each pair of antennas may include a separation between the antennas of one half of a wavelength (or approximately one half of a wavelength).

In some aspects, for example, the phased array may include a plurality of antenna elements, and beamforming the radio frequency signal may include adjusting only a phase corresponding to each antenna element of the plurality of antenna elements. In some aspects, each pair of the plurality of antenna elements may be separated by at least one half of a wavelength of the radio frequency signal. In some aspects, a size of the phased array is greater than a wavelength of the radio frequency signal. For example, the size of the phased array may be much greater than a wavelength (e.g., greater than at least two wavelengths, greater than at least three wavelengths, and/or greater than at least four wavelengths, among other examples).

In some aspects, the network node 502 may include an RIS and the plurality of antenna elements (which may be referred to as "reflective elements") may be driven by only one power amplifier. In some aspects, the network node 502 may transmit the radio frequency signal using an antenna system having an antenna panel and a reflector array, where beamforming the radio frequency signal may include adjusting a phase of a reflector element of the reflector array. In some aspects, the network node 502 may transmit the radio frequency signal by transmitting the radio frequency signal using an antenna element of an antenna system having an antenna panel.

The antenna panel may include the antenna element, and a first lens, where the target area is associated with an additional network node having a second lens, and where the reference location is located outside of a focal length of the first lens. In some aspects, the virtual image may correspond to a real image that is located within a focal length of the second lens. In some aspects, the network node 502 may transmit the radio frequency signal using an antenna element of an antenna system having an antenna panel, that includes the antenna element and a lens. The reference location may be located within a focal length of the lens.

In some aspects, as shown by reference number 510, the network node 502 may determine at least one additional reference location associated with at least one additional virtual image corresponding to at least one additional target area. As shown by reference number 512, the network node 502 may transmit at least one additional radio frequency signal, where the at least one additional radio frequency signal is beamformed based at least in part on the at least one additional reference location to direct the at least one additional radio frequency signal to the at least one additional target area.

For example, as shown in FIG. 5, the network node 502 may include an antenna panel 514 having a number of antenna elements 516. The network node 502 may partition the antenna panel 514 into a first sub-panel 518 and a second sub-panel 520. The network node 502 may use the first sub-panel 518 to transmit a first radio frequency signal 522 to a first target area 524 and may use the second sub-panel 520 to transmit a second radio frequency signal 526 to a second target area 528. As shown, for example, the first sub-panel 518 corresponds to a first location on the antenna panel 514 and the second sub-panel 520 corresponds to a second location on the antenna panel 514. The first and second locations may be separated so that the first and second signals 522 and 526 may target different target areas 524 and 528, respectively, where the target areas 524 and 528 do not fully overlap. The target areas 524 and 528 may be non-overlapping or partially-overlapping. In some aspects, the network node 502 may transmit any number of additional signals using any number of additional sub-panels.

In some aspects, the network node 502 may be an OAM network node and the network node 502 may transmit the radio frequency signal using only a mode 0 of an OAM antenna array. There may be no azimuth rotation in the signal from the virtual image and, thus only mode 0 may be used for broad coverage. In some aspects, for example, mode 0 may be transmitted from multiple circles of antenna elements with the phase offset according to the virtual image:

$$\exp\left[+\frac{i2\pi\sqrt{r^2+z_v^2}}{\lambda}\right] \sim \exp\left[+\frac{i\pi r^2}{\lambda|z_v|}\right],$$

where r is the radius of the circle, assuming the virtual image is vertically aligned with the center of the circle, and where $z_v$ is a normal distance from the virtual image to the antenna element. For a virtual image offset from the center, the following general formula may be used:

$$\exp\left[+\frac{i2\pi\sqrt{(x-x_v)^2+(y-y_v)^2+z_v^2}}{\lambda}\right] \sim \exp\left[+\frac{i\pi\left[(x-x_v)^2+(y-y_v)^2\right]}{\lambda|z_v|}\right].$$

As shown by reference number 530, the network node 504 may transmit, and the network node 502 may receive, an access signal. For example, in some aspects, the radio frequency signal and/or the at least one additional radio frequency signal may include broadcast signals containing synchronization signal blocks (SSBs) and/or other system information that may be used for device discovery and/or to support network access. Upon receiving the system information, the network node 504 may transmit the access signal, which may include, for example, a physical random access channel (PRACH) transmission to facilitate obtaining access to a network associated with the network node 502. Subsequently, as shown by reference number 532, the network node 502 may transmit a reference signal to support, for example, beam forming, channel estimation, and/or resource allocation, among other examples. In some aspects, the reference signal may be transmitted using a narrower beam directed to the network node 504. In some other aspects, the reference signal may be transmitted using a broader beam by using a virtual image, as described above.

In some aspects, the same concepts described above in connection with transmitting radio frequency signals may be applied to a receiver network node in connection with receiving signals. For example, the network node 504 may utilize beamforming based on virtual images when receiving a radio frequency signal such as a system broadcast signal, a synchronization signal, and/or a reference signal, among other examples.

For example, as shown by reference number 534, the network node 504 may determine a reference location associated with a virtual image corresponding to a target area. For example, the target area may be an area in which the network node 504 is monitoring for signals, an area in which the network node 504 is located, and/or an area in which the network node 504 is traveling, among other examples. In some aspects, the virtual image may include a virtual point source for the radio frequency signal. In some aspects, determining the reference location may include determining a source signal distribution associated with the radio frequency signal at the reference location. In some aspects, the reference location may be based at least in part on a range associated with the target area.

As shown by reference number 508 (as described above), the network node 504 may receive a radio frequency signal. In some aspects, the network node 504 may receive the radio frequency signal by beamforming a reception beam based at least in part on the virtual image. For example, the network node 504 may receive the radio frequency signal based at least in part on beamforming the radio frequency signal based at least in part on at least one of a phase adjustment corresponding to an antenna element of a phased array or a geometric configuration of a lens associated with an antenna system of the network node.

In some aspects, for example, the phased array may include a plurality of antenna elements, and beamforming the radio frequency signal may include adjusting only a phase corresponding to each antenna element of the plurality of antenna elements. In some aspects, each pair of the plurality of antenna elements may be separated by at least one half of a wavelength of the radio frequency signal. A size of the phased array may be greater than a wavelength of the radio frequency signal. For example, the size of the phased array may be much greater than a wavelength (e.g., greater than two wavelengths and/or greater than three wavelengths, among other examples).

In some aspects, receiving the radio frequency signal may include receiving the radio frequency signal using a sub-panel of an antenna panel of the network node. In some aspects, for example, the network node 504 may determine at least one additional reference location associated with at least one additional virtual image corresponding to at least one additional target area. As shown by reference number 512, the network node 504 may receive at least one additional radio frequency signal. For example, the network node 504 may use at least one additional sub-panel of the antenna panel to receive the least one additional radio frequency signal. The at least one additional radio frequency signal may be beamformed based at least in part on the at least one additional reference location to direct the at least one additional radio frequency signal to the at least one additional target area associated with a reception antenna.

In some aspects, the virtual image may correspond to a point spread function associated with an aperture of an antenna panel of the network node 504. In some aspects, receiving the radio frequency signal may include receiving the radio frequency signal using only a mode 0 of an OAM antenna array. In some aspects, receiving the radio frequency signal may include receiving the radio frequency signal using an antenna element of an antenna system having an antenna panel, that includes the antenna element, and a first lens. The target area may be associated with an additional network node (e.g., the network node 502) having a second lens, and the reference location may be located outside of a focal length of the first lens. The virtual image may correspond to a real image that is located within a focal length of the second lens. In some aspects, receiving the radio frequency signal may include receiving the radio frequency signal using an antenna element of an antenna system having an antenna panel, that includes the antenna element, and a lens, where the reference location is located within a focal length of the lens. In some aspects, receiving the radio frequency signal may include receiving the radio frequency signal using an antenna system having an antenna panel and a reflector array, where beamforming the radio frequency signal includes adjusting a phase of a reflector element of the reflector array.

As indicated above, FIG. 5 is provided as an example. Other examples may differ from what is described with regard to FIG. 5.

Figure 6B:
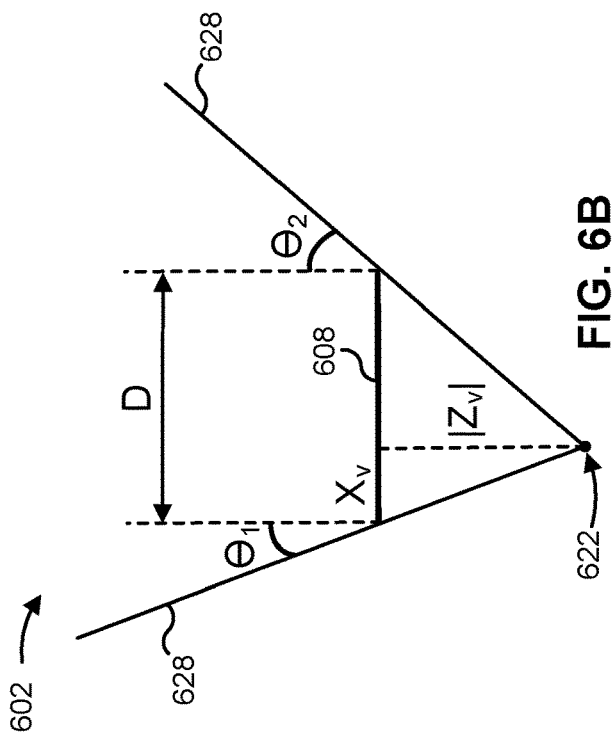
Figure 6A:
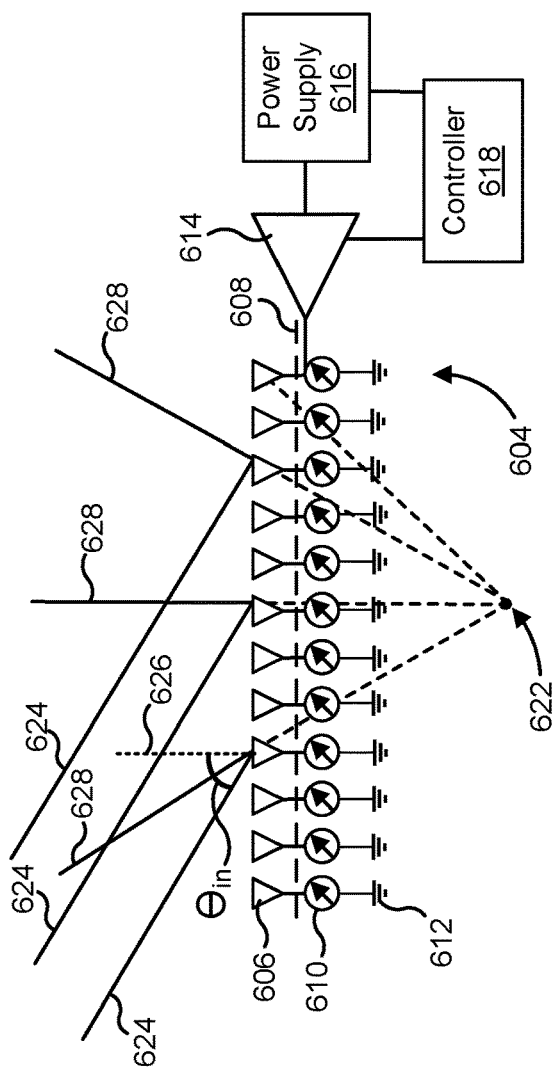

FIGS. 6A and 6B are diagrams illustrating examples 600 and 602 associated with beamforming based on virtual images, in accordance with the present disclosure. In some aspects, a transmitting network node (e.g., the network node 502) and/or a receiving network node (e.g., the network node 504) may include an RIS configured as a rectangular reflector array 604.

As shown in FIG. 6A, the rectangular reflector array 604 may include a set of reflecting elements 606 disposed adjacent to a ground plane 608. In some aspects, the reflecting elements 606 may be referred to as "antenna elements." Each reflecting element 606 may be coupled to a phase shifting component 610, and each phase shifting component 610 may be coupled to a respective grounding component 612. In some aspects, each reflecting element 606 may be coupled to two phase shifting components 610, one for each polarization. In some aspects, the set of reflecting elements 606 may be driven by a single power amplifier 614. The power amplifier 614 may be coupled to a power supply 616 and may be controlled by a controller 618. For example, a single power amplifier 614 may be used (as opposed to a power amplifier corresponding to each reflecting element 606), as the power amplifier 614 may be configured to provide just enough power to offset energy loss due to reflection of a signal and/or phase adjustment thereof. In some aspects, a complexity of the controller and/or power consumption by the power amplifier 614 may be based at least in part on selection of phase shifting components 610.

The example 602 of FIG. 6B depicts an analysis of certain aspects of the rectangular reflector array for beamforming a reflected signal. To determine the reference location $(x_v, z_v)$ associated with a virtual image 622, the rectangular reflector array 604 may be analyzed one dimension at a time. For example, in some aspects, an incoming signal (wave) 624 may be a plane wave from a specific direction, $\theta_{in}$, with phase term:

$$\exp(jk \times \sin \theta_{in}),$$

where $\theta_{in}$ is positive if the rotation is counterclockwise from the normal line 626. The reflected wave 628 may be directed to different directions by phase shifting at each individual reflecting element 606. In 3D beamforming, the reflective wave 628 may converge to a specific point (x',z') (not shown), and the phase of the reflected wave is:

$$\exp\left[-\frac{i2\pi\sqrt{(x-x')^2+z'^2}}{\lambda}\right] \sim \exp\left[-\frac{i\pi(x-x')^2}{\lambda z'}\right].$$

In 2D beamforming, z' may be so large that $$\frac{x^2}{\lambda z'} \ll 1,$$

and the phase of the reflected wave 628 may be approximated by a phase of the plane wave:

$$\exp\left[-\frac{i2\pi xx'}{\lambda z'}\right] = \exp\left[-\frac{i2\pi x \sin\theta_{out}}{\lambda}\right].$$

In either case, the output coverage is generally narrow as it is either converging to (x', z'), or limited to an angle of $\theta_{out}$. To form a broad wave that may be directed to a target area, as described above in connection with FIG. 5, instead of converging the reflected signal, the network node (e.g., network node 502) may cause the reflected wave 628 to diverge from the virtual image 622, associated with the reference location $(x_v, z_v)$. The phase of the reflected wave 628 may be:

$$\exp\left[+\frac{i2\pi\sqrt{(x-x_v)^2+z_v^2}}{\lambda}\right] \sim \exp\left[+\frac{i\pi(x-x_v)^2}{\lambda|z_v|}\right].$$

If $\theta_1$ or $\theta_2$ is large such that the par-axial approximation $x_v^2/z_v^2 \ll 1$ does not hold, the phase term for the transmitter may be:

$$\exp\left[+\frac{i2\pi\sqrt{(x-x_v)^2+z_v^2}}{\lambda}\right].$$

The choice of x' and z' depends on the size of the target area. For example, to specify an angular range for uniform coverage, $\theta_1$ and $\theta_2$ may be determined such that:

$$x_v = \frac{\tan(\theta_1)}{\tan(\theta_1)+\tan(\theta_2)}D, \text{ and}$$

$$z_v = \frac{x_v}{\tan(\theta_1)}.$$

As described above, a single power amplifier may be sufficient to facilitate mitigation of power loss since the difference among the reflecting elements 606 is in phase only. In some aspects, the phase shift at each reflecting element 606 may be based at least in part on both the requisite phase for the output beam and the phase of the incoming beam:

$$\sim \exp\left[+\frac{i\pi(x-x_v)^2}{\lambda|z_v|}\right] \Big/ \exp\left[+\frac{i2\pi x \sin\theta_{in}}{\lambda}\right].$$

In some aspects, a holographic MIMO (H-MIMO) system and an LoS MIMO system (e.g., a massive rectangular MIMO array for LoS operations) each may be modeled as a rectangular transmitter array with discrete antenna units. For example, in some aspects, by replacing the reflecting elements in the rectangular reflecting array with transmitters, the analysis described above may be similarly applied to H-MIMO and LoS MIMO. In those cases, the phase term at the transmitter is:

$$\exp\left[+\frac{i2\pi\sqrt{(x-x_v)^2+z_v^2}}{\lambda}\right] \sim \exp\left[+\frac{i\pi(x-x_v)^2}{\lambda|z_v|}\right].$$

Because the y-axis may be analyzed similarly, the overall phase term for RIS, H-MIMO, and LoS MIMO may be:

$$\exp\left[+\frac{i2\pi\sqrt{(x-x_v)^2+(y-y_v)^2+z_v^2}}{\lambda}\right] \sim \exp\left[+\frac{i\pi[(x-x_v)^2+(y-y_v)^2]}{\lambda|z_v|}\right].$$

As indicated above, FIGS. 6A and 6B are provided as examples. Other examples may differ from what is described with regard to FIGS. 6A and 6B.

FIGS. 7A and 7B are diagrams illustrating examples 700 and 702 associated with beamforming based on virtual images, in accordance with the present disclosure. In some aspects, as shown in FIG. 7A, a network node 704 may include a lens-MIMO antenna system having one or more antenna elements 706 and a lens 708. The network node 704 may be a transmitting network node (e.g., the network node 502) and/or a receiving network node (e.g., the network node 504).

To facilitate broad coverage of a target area 710, as shown in the example 700, the one or more antenna elements 706 are located within the focal length, f, of the lens 708. Accordingly, the reference location 712 (associated with a virtual image) is located behind the one or more antenna elements 706 (e.g., displaced from the antenna elements in a direction opposite that of the direction of transmission), as shown. In this way, the signal 714 is refracted by the lens 708 to form a refracted signal 716 that diverges in the direction of the target area 710.

In some aspects, as shown in example 702, a receiving network node 718 also may include a lens 720. In the system of example 702, both the transmitter network node 704 and the receiver network node 718 are on the respective focal plane. The target area 710 may be associated with the receiving network node 718. For example, the target area 710 may be determined so that the antenna elements 722 of the receiving network node 718 are adjacent to the target area 710. In this case, the one or more antenna elements 706 may be disposed slightly outside of the focal length f1 of the lens 708 so that the refracted signal 716 converges at a convergence point 724. The convergence point represents a real image of the lens 708 and an object for the lens 720. As shown, the convergence point 724 may be located within the focal length, f2, of the lens 720 of the receiving network node 718. The virtual image associated with the reference location 712 is disposed behind the real image, which is located at the convergence point 724 (e.g., between the convergence point and the first lens 708), where the lens 720 acts as a magnifier lens, and a final virtual image may be formed for the target area 710.

As indicated above, FIGS. 7A and 7B are provided as examples. Other examples may differ from what is described with regard to FIGS. 7A and 7B.

Figure 8:
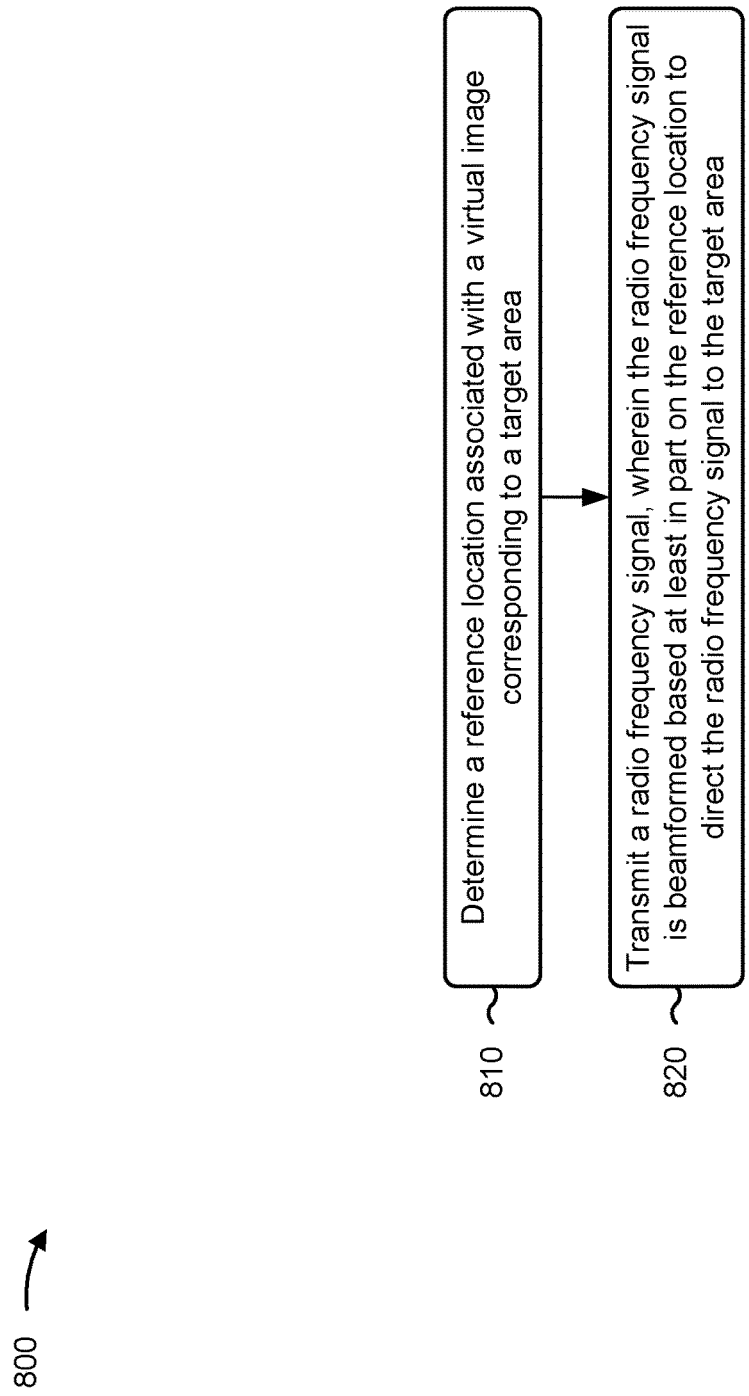
FIGS. 8 and 9 are diagrams illustrating example processes associated with beamforming based on virtual images, in accordance with the present disclosure.

FIG. 8 is a diagram illustrating an example process 800 performed, for example, by a network node, in accordance with the present disclosure. Example process 800 is an example where the network node (e.g., network node 502) performs operations associated with beamforming based on virtual images. Process 800 may include additional aspects, such as any single aspect or any combination of aspects described below and/or in connection with one or more other processes described elsewhere herein.

As shown in FIG. 8, in some aspects, process 800 may include determining a reference location associated with a virtual image corresponding to a target area (block 810). For example, the network node (e.g., using communication manager 1008 and/or determination component 1010, depicted in FIG. 10) may determine a reference location associated with a virtual image corresponding to a target area, as described above in connection with FIGS. 5-7B. In some aspects, the virtual image comprises a virtual point source for the radio frequency signal. In some aspects, determining the reference location comprises determining a source signal distribution associated with the radio frequency signal at the reference location. In some aspects, the reference location is based at least in part on a range associated with the target area.

As further shown in FIG. 8, in some aspects, process 800 may include transmitting a radio frequency signal, wherein the radio frequency signal is beamformed based at least in part on the reference location to direct the radio frequency signal to the target area (block 820). For example, the network node (e.g., using communication manager 1008 and/or transmission component 1004, depicted in FIG. 10) may transmit a radio frequency signal, wherein the radio frequency signal is beamformed based at least in part on the reference location to direct the radio frequency signal to the target area, as described above in connection with FIGS. 5-7B. In some aspects, the radio frequency signal comprises at least one of a system broadcast signal, a synchronization signal, or a reference signal.

In some aspects, transmitting the radio frequency signal comprises beamforming the radio frequency signal based at least in part on at least one of a phase adjustment corresponding to an antenna element of a phased array or a geometric configuration of a lens associated with an antenna system of the network node. In some aspects, the phased array comprises a plurality of antenna elements, and beamforming the radio frequency signal comprises adjusting only a phase corresponding to each antenna element of the plurality of antenna elements. In some aspects, each pair of the plurality of antenna elements are separated by at least one half of a wavelength of the radio frequency signal. In some aspects, a size of the phased array is greater than a wavelength of the radio frequency signal. In some aspects, the plurality of antenna elements is driven by only one power amplifier.

In some aspects, the network node includes an antenna system having a MIMO configuration. In some aspects, transmitting the radio frequency signal comprises transmitting the radio frequency signal using a sub-panel of an antenna panel of the network node, and process 800 includes determining at least one additional reference location associated with at least one additional virtual image corresponding to at least one additional target area, and transmitting, using at least one additional sub-panel of the antenna panel, at least one additional radio frequency signal, wherein the at least one additional radio frequency signal is beamformed based at least in part on the at least one additional reference location to direct the at least one additional radio frequency signal to the at least one additional target area.

In some aspects, the sub-panel corresponds to a first location on the antenna panel and the at least one additional sub-panel corresponds to a second location on the antenna panel, wherein the first location and the second location are separated. In some aspects, the virtual image corresponds to a point spread function associated with an aperture of an antenna panel of the network node. In some aspects, transmitting the radio frequency signal comprises transmitting the radio frequency signal using only a mode 0 of an orbital angular momentum antenna array.

In some aspects, transmitting the radio frequency signal comprises transmitting the radio frequency signal using an antenna element of an antenna system having an antenna panel, that includes the antenna element, and a first lens, wherein the target area is associated with an additional network node having a second lens, and the antenna element is located outside of a focal length of the first lens. In some aspects, the virtual image is located between the first lens and a convergence point that corresponds to a real image that is located within a focal length of the second lens.

In some aspects, transmitting the radio frequency signal comprises transmitting the radio frequency signal using an antenna element of an antenna system having an antenna panel, that includes the antenna element, and a lens, and the reference location is displaced from the antenna element in a direction opposite a direction of transmission. In some aspects, transmitting the radio frequency signal comprises transmitting the radio frequency signal using an antenna system having an antenna panel and a reflector array, and beamforming the radio frequency signal comprises adjusting a phase of a reflector element of the reflector array.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
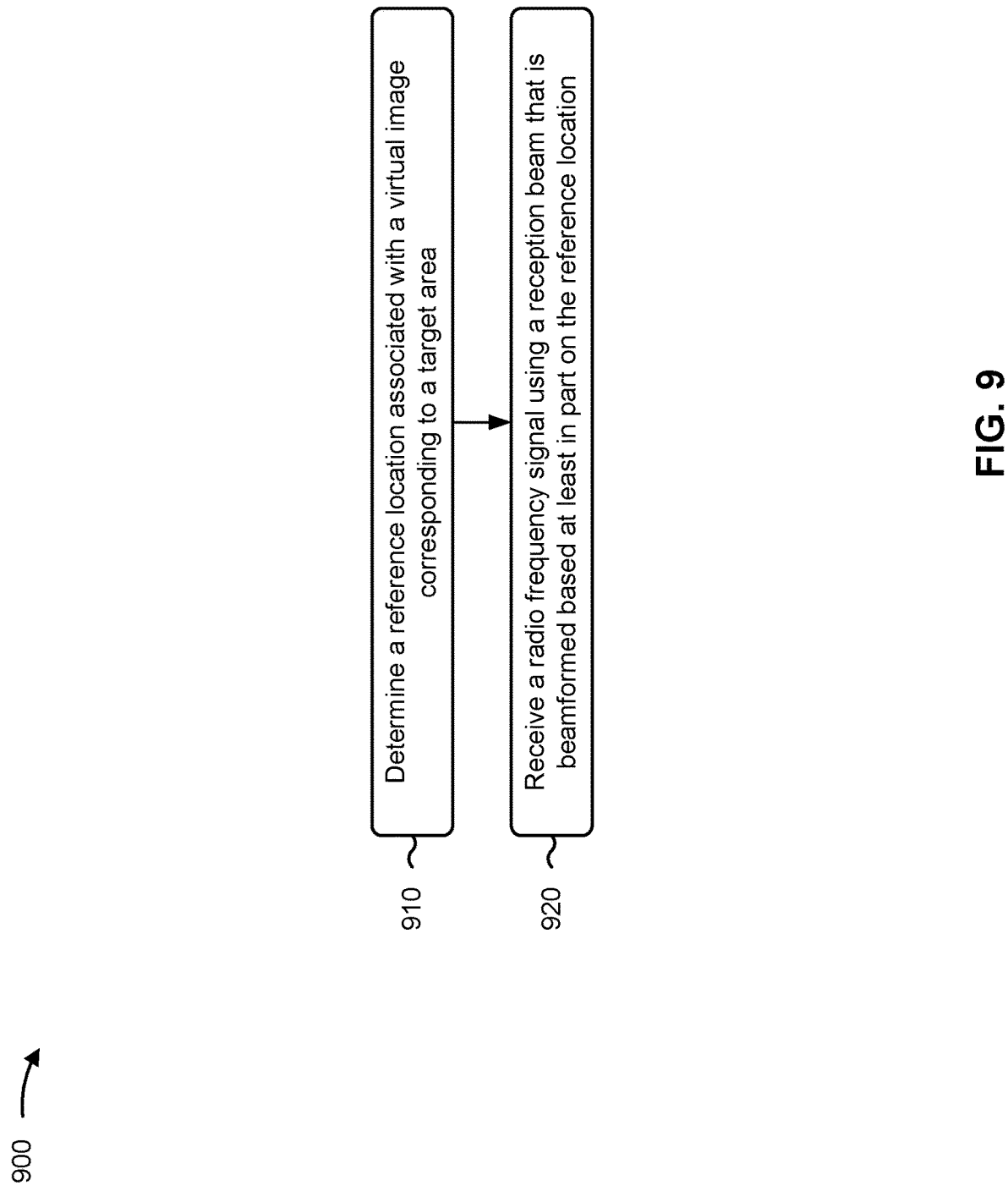

FIG. 9 is a diagram illustrating an example process 900 performed, for example, by a network node having a lens, in accordance with the present disclosure. Example process 900 is an example where the network node (e.g., network node 504) performs operations associated with beamforming based on virtual images. Process 900 may include additional aspects, such as any single aspect or any combination of aspects described below and/or in connection with one or more other processes described elsewhere herein.

As shown in FIG. 9, in some aspects, process 900 may include determining a reference location associated with a virtual image corresponding to a target area (block 910). For example, the network node (e.g., using communication manager 1008 and/or determination component 1010, depicted in FIG. 10) may determine a reference location associated with a virtual image corresponding to a target area, as described above in connection with FIGS. 5-7B. In some aspects, the virtual image comprises a virtual point source for the radio frequency signal. In some aspects, determining the reference location comprises determining a source signal distribution associated with the radio frequency signal at the reference location. In some aspects, the reference location is based at least in part on a range associated with the target area.

As further shown in FIG. 9, in some aspects, process 900 may include receiving a radio frequency signal using a reception beam that is beamformed based at least in part on the reference location (block 920). For example, the network node (e.g., using communication manager 1008 and/or reception component 1002, depicted in FIG. 10) may receive a radio frequency signal using a reception beam that is beamformed based at least in part on the reference location, as described above in connection with FIGS. 5-7B. In some aspects, the radio frequency signal comprises at least one of a system broadcast signal, a synchronization signal, or a reference signal.

In some aspects, receiving the radio frequency signal comprises beamforming the radio frequency signal based at least in part on at least one of a phase adjustment corresponding to an antenna element of a phased array or a geometric configuration of a lens associated with an antenna system of the network node. In some aspects, the phased array comprises a plurality of antenna elements, and beamforming the radio frequency signal comprises adjusting only a phase corresponding to each antenna element of the plurality of antenna elements. In some aspects, each pair of the plurality of antenna elements are separated by at least one half of a wavelength of the radio frequency signal. In some aspects, a size of the phased array is greater than a wavelength of the radio frequency signal. In some aspects, the network node includes an antenna system having a MIMO configuration.

In some aspects, receiving the radio frequency signal comprises receiving the radio frequency signal using a sub-panel of an antenna panel of the network node, and process 900 includes comprising determining at least one additional reference location associated with at least one additional virtual image corresponding to at least one additional target area, and receiving, using at least one additional sub-panel of the antenna panel, at least one additional radio frequency signal, wherein the at least one additional radio frequency signal is beamformed based at least in part on the at least one additional reference location to direct the at least one additional radio frequency signal to the at least one additional target area. In some aspects, the sub-panel corresponds to a first location on the antenna panel and the at least one additional sub-panel corresponds to a second location on the antenna panel, wherein the first location and the second location are separated.

In some aspects, the virtual image corresponds to a point spread function associated with an aperture of an antenna panel of the network node. In some aspects, receiving the radio frequency signal comprises receiving the radio frequency signal using only a mode 0 of an orbital angular momentum antenna array.

In some aspects, receiving the radio frequency signal comprises receiving the radio frequency signal using an antenna element of an antenna system having an antenna panel, that includes the antenna element, and the lens, wherein a convergence point is located between the reference location and the lens, and wherein the convergence point is located within a focal length of the lens. In some aspects, a real image is located at the convergence point.

In some aspects, receiving the radio frequency signal comprises receiving the radio frequency signal using an antenna system having an antenna panel and a reflector array, and beamforming the radio frequency signal comprises adjusting a phase of a reflector element of the reflector array.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
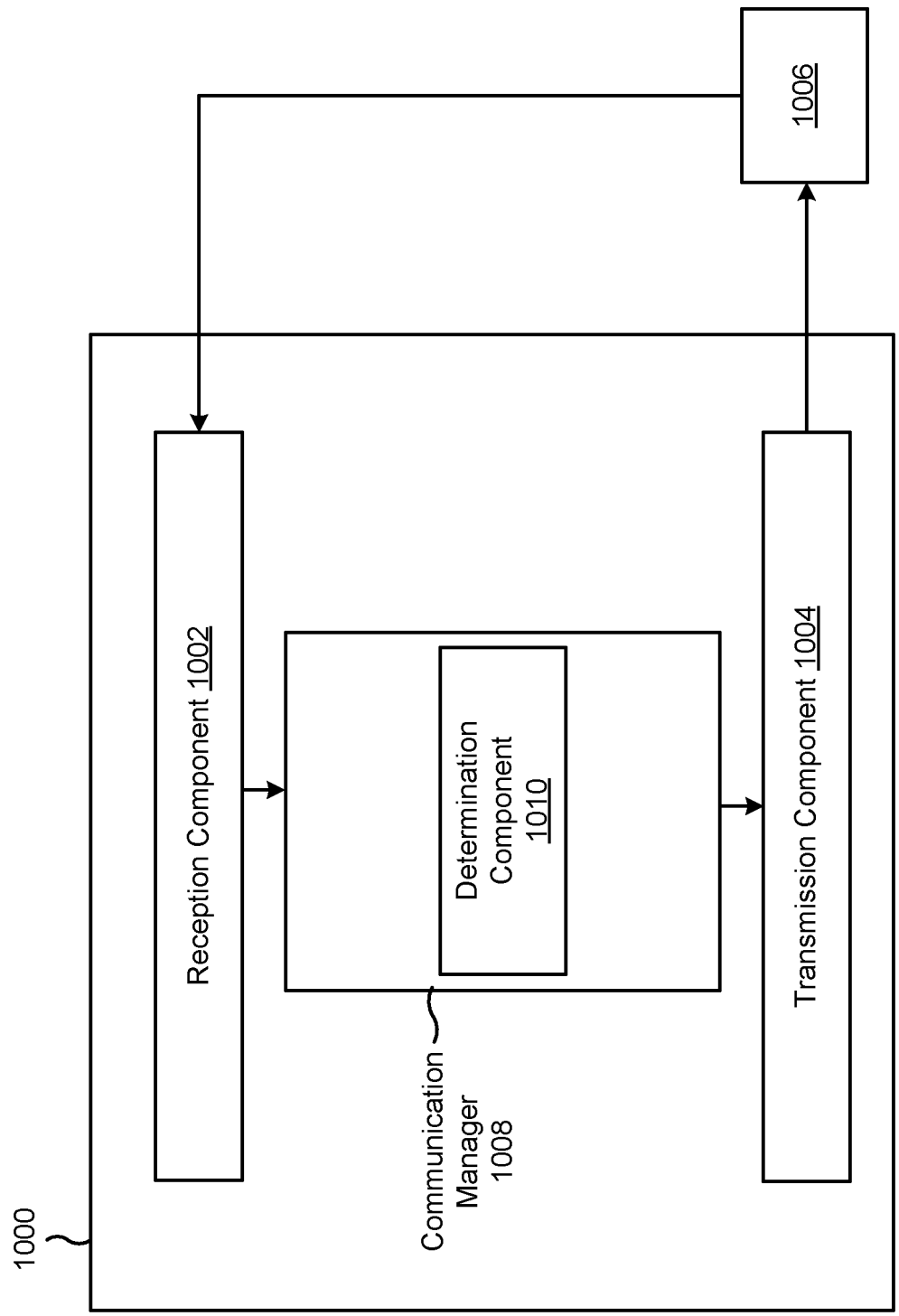
FIG. 10 is a diagram of an example apparatus for wireless communication, in accordance with the present disclosure.

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may include a determination component 1010.

In some aspects, the apparatus 1000 may be configured to perform one or more operations described herein in connection with FIGS. 5-7B. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE or the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE or the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE or the base station described in connection with FIG. 2. In some aspects, the transmission component 1004 may be co-located with the reception component 1002 in a transceiver.

The communication manager 1008 and/or the determination component 1010 may determine a reference location associated with a virtual image corresponding to a target area. The transmission component 1004 may transmit a radio frequency signal, wherein the radio frequency signal is beamformed based at least in part on the reference location to direct the radio frequency signal to the target area. In some aspects, the communication manager 1008 may include one or more antennas, a modem, a controller/processor, a memory, or a combination thereof, of the UE or the base station described in connection with FIG. 2. In some aspects, the communication manager 1008 may be, be similar to, include, or be included in, the communication manager 140 or the communication manager 150, depicted in FIGS. 1 and 2. In some aspects, the communication manager 1008 may include the reception component 1002 and/or the transmission component 1004. In some aspects, the determination component 1010 may include one or more antennas, a modem, a controller/processor, a memory, or a combination thereof, of the UE or the base station described in connection with FIG. 2. In some aspects, the determination component 1010 may include the reception component 1002 and/or the transmission component 1004.

The determination component 1010 may determine a reference location associated with a virtual image corresponding to a target area. The reception component 1002 may receive a radio frequency signal using a reception beam that is beamformed based at least in part on the reference location.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: determining a reference location associated with a virtual image corresponding to a target area; and transmitting a radio frequency signal, wherein the radio frequency signal is beamformed based at least in part on the reference location to direct the radio frequency signal to the target area.

Aspect 2: The method of Aspect 1, wherein the virtual image comprises a virtual point source for the radio frequency signal.

Aspect 3: The method of either of Aspects 1 or 2, wherein determining the reference location comprises determining a source signal distribution associated with the radio frequency signal at the reference location.

Aspect 4: The method of any of Aspects 1-3, wherein transmitting the radio frequency signal comprises beamforming the radio frequency signal based at least in part on at least one of a phase adjustment corresponding to an antenna element of a phased array or a geometric configuration of a lens associated with an antenna system of the network node.

Aspect 5: The method of Aspect 4, wherein the phased array comprises a plurality of antenna elements, and beamforming the radio frequency signal comprises adjusting only a phase corresponding to each antenna element of the plurality of antenna elements.

Aspect 6: The method of Aspect 5, wherein each pair of the plurality of antenna elements are separated by at least one half of a wavelength of the radio frequency signal.

Aspect 7: The method of Aspect 6, wherein a size of the phased array is greater than a wavelength of the radio frequency signal.

Aspect 8: The method of any of Aspects 5-7, wherein the plurality of antenna elements is driven by only one power amplifier.

Aspect 9: The method of any of Aspects 1-8, wherein the network node includes an antenna system having a multiple input multiple output (MIMO) configuration.

Aspect 10: The method of any of Aspects 1-9, wherein the reference location is based at least in part on a range associated with the target area.

Aspect 11: The method of any of Aspects 1-10, wherein transmitting the radio frequency signal comprises transmitting the radio frequency signal using a sub-panel of an antenna panel of the network node, the method further comprising: determining at least one additional reference location associated with at least one additional virtual image corresponding to at least one additional target area; and transmitting, using at least one additional sub-panel of the antenna panel, at least one additional radio frequency signal, wherein the at least one additional radio frequency signal is beamformed based at least in part on the at least one additional reference location to direct the at least one additional radio frequency signal to the at least one additional target area.

Aspect 12: The method of Aspect 11, wherein the sub-panel corresponds to a first location on the antenna panel and the at least one additional sub-panel corresponds to a second location on the antenna panel, wherein the first location and the second location are separated.

Aspect 13: The method of any of Aspects 1-12, wherein the virtual image corresponds to a point spread function associated with an aperture of an antenna panel of the network node.

Aspect 14: The method of any of Aspects 1-13, wherein transmitting the radio frequency signal comprises transmitting the radio frequency signal using only a mode 0 of an orbital angular momentum antenna array.

Aspect 15: The method of any of Aspects 1-14, wherein transmitting the radio frequency signal comprises transmitting the radio frequency signal using an antenna element of an antenna system having an antenna panel, that includes the antenna element, and a first lens, wherein the target area is associated with an additional network node having a second lens, and wherein the antenna element is located outside of a focal length of the first lens.

Aspect 16: The method of Aspect 15, wherein the virtual image is located between the first lens and a convergence point that corresponds to a real image that is located within a focal length of the second lens.

Aspect 17: The method of any of Aspects 1-14, wherein transmitting the radio frequency signal comprises transmitting the radio frequency signal using an antenna element of an antenna system having an antenna panel, that includes the antenna element, and a lens, and wherein the reference location is displaced from the antenna element in a direction opposite a direction of transmission.

Aspect 18: The method of any of Aspects 1-14, wherein transmitting the radio frequency signal comprises transmitting the radio frequency signal using an antenna system having an antenna panel and a reflector array, and wherein beamforming the radio frequency signal comprises adjusting a phase of a reflector element of the reflector array.

Aspect 19: The method of any of Aspects 1-18, wherein the radio frequency signal comprises at least one of a system broadcast signal, a synchronization signal, or a reference signal.

Aspect 20: A method of wireless communication performed by a network node having a lens, comprising: determining a reference location associated with a virtual image corresponding to a target area; and receiving a radio frequency signal using a reception beam that is beamformed based at least in part on the reference location.

Aspect 21: The method of Aspect 20, wherein the virtual image comprises a virtual point source for the radio frequency signal.

Aspect 22: The method of either of Aspects 20 or 21, wherein determining the reference location comprises determining a source signal distribution associated with the radio frequency signal at the reference location.

Aspect 23: The method of any of Aspects 20-22, wherein receiving the radio frequency signal comprises beamforming the radio frequency signal based at least in part on at least one of a phase adjustment corresponding to an antenna element of a phased array or a geometric configuration of a lens associated with an antenna system of the network node.

Aspect 24: The method of Aspect 23, wherein the phased array comprises a plurality of antenna elements, and beamforming the radio frequency signal comprises adjusting only a phase corresponding to each antenna element of the plurality of antenna elements.

Aspect 25: The method of Aspect 24, wherein each pair of the plurality of antenna elements are separated by at least one half of a wavelength of the radio frequency signal.

Aspect 26: The method of Aspect 25, wherein a size of the phased array is greater than a wavelength of the radio frequency signal.

Aspect 27: The method of any of Aspects 20-26, wherein the network node includes an antenna system having a multiple input multiple output (MIMO) configuration.

Aspect 28: The method of any of Aspects 20-27, wherein the reference location is based at least in part on a range associated with the target area.

Aspect 29: The method of any of Aspects 20-28, wherein receiving the radio frequency signal comprises receiving the radio frequency signal using a sub-panel of an antenna panel of the network node, the method further comprising: determining at least one additional reference location associated with at least one additional virtual image corresponding to at least one additional target area; and receiving, using at least one additional sub-panel of the antenna panel, at least one additional radio frequency signal, wherein the at least one additional radio frequency signal is beamformed based at least in part on the at least one additional reference location to direct the at least one additional radio frequency signal to the at least one additional target area.

Aspect 30: The method of Aspect 29, wherein the sub-panel corresponds to a first location on the antenna panel and the at least one additional sub-panel corresponds to a second location on the antenna panel, wherein the first location and the second location are separated.

Aspect 31: The method of any of Aspects 20-30, wherein the virtual image corresponds to a point spread function associated with an aperture of an antenna panel of the network node.

Aspect 32: The method of any of Aspects 20-31, wherein receiving the radio frequency signal comprises receiving the radio frequency signal using only a mode 0 of an orbital angular momentum antenna array.

Aspect 33: The method of any of Aspects 20-32, wherein receiving the radio frequency signal comprises receiving the radio frequency signal using an antenna element of an antenna system having an antenna panel, that includes the antenna element, and the lens, wherein a convergence point is located between the reference location and the lens, and wherein the convergence point is located within a focal length of the lens.

Aspect 34: The method of Aspect 33, wherein a real image is located at the convergence point.

Aspect 35: The method of any of Aspects 20-34, wherein receiving the radio frequency signal comprises receiving the radio frequency signal using an antenna system having an antenna panel and a reflector array, and wherein beamforming the radio frequency signal comprises adjusting a phase of a reflector element of the reflector array.

Aspect 36: The method of any of Aspects 20-35, wherein the radio frequency signal comprises at least one of a system broadcast signal, a synchronization signal, or a reference signal.

Aspect 37: An apparatus for wireless communication at a device, comprising a processor; memory coupled with the processor; and instructions stored in the memory and executable by the processor to cause the apparatus to perform the method of one or more of Aspects 1-19.

Aspect 38: A device for wireless communication, comprising a memory and one or more processors coupled to the memory, the one or more processors configured to perform the method of one or more of Aspects 1-19.

Aspect 39: An apparatus for wireless communication, comprising at least one means for performing the method of one or more of Aspects 1-19.

Aspect 40: A non-transitory computer-readable medium storing code for wireless communication, the code comprising instructions executable by a processor to perform the method of one or more of Aspects 1-19.

Aspect 41: A non-transitory computer-readable medium storing a set of instructions for wireless communication, the set of instructions comprising one or more instructions that, when executed by one or more processors of a device, cause the device to perform the method of one or more of Aspects 1-19.

Aspect 42: An apparatus for wireless communication at a device, comprising a processor; memory coupled with the processor; and instructions stored in the memory and executable by the processor to cause the apparatus to perform the method of one or more of Aspects 20-36.

Aspect 43: A device for wireless communication, comprising a memory and one or more processors coupled to the memory, the one or more processors configured to perform the method of one or more of Aspects 20-36.

Aspect 44: An apparatus for wireless communication, comprising at least one means for performing the method of one or more of Aspects 20-36.

Aspect 45: A non-transitory computer-readable medium storing code for wireless communication, the code comprising instructions executable by a processor to perform the method of one or more of Aspects 20-36.

Aspect 46: A non-transitory computer-readable medium storing a set of instructions for wireless communication, the set of instructions comprising one or more instructions that, when executed by one or more processors of a device, cause the device to perform the method of one or more of Aspects 20-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   a memory; and
   one or more processors, coupled to the memory, configured to:
      determine a reference location associated with a virtual image corresponding to a target area; and transmit a radio frequency signal, wherein the radio frequency signal is beamformed based at least in part on the reference location to direct the radio frequency signal to the target area.

2. The network node of claim 1, wherein the virtual image comprises a virtual point source for the radio frequency signal.

3. The network node of claim 1, wherein the one or more processors, to determine the reference location, are configured to determine a source signal distribution associated with the radio frequency signal at the reference location.

4. The network node of claim 1, wherein the one or more processors, to transmit the radio frequency signal, are configured to beamform the radio frequency signal based at least in part on at least one of a phase adjustment corresponding to an antenna element of a phased array or a geometric configuration of a lens associated with an antenna system of the network node.

5. The network node of claim 4, wherein the phased array comprises a plurality of antenna elements, and wherein the one or more processors, to beamform the radio frequency signal, are configured to adjust only a phase corresponding to each antenna element of the plurality of antenna elements.

6. The network node of claim 5, wherein each pair of the plurality of antenna elements are separated by at least one half of a wavelength of the radio frequency signal.

7. The network node of claim 5, wherein the plurality of antenna elements is driven by only one power amplifier.

8. The network node of claim 1, wherein the network node includes an antenna system having a multiple input multiple output (MIMO) configuration.

9. The network node of claim 1, wherein the reference location is based at least in part on a range associated with the target area.

10. The network node of claim 1, wherein the one or more processors, to transmit the radio frequency signal, are configured to transmit the radio frequency signal using a sub-panel of an antenna panel of the network node, and wherein the one or more processors are further configured to:
determine at least one additional reference location associated with at least one additional virtual image corresponding to at least one additional target area; and
transmit, using at least one additional sub-panel of the antenna panel, at least one additional radio frequency signal, wherein the at least one additional radio frequency signal is beamformed based at least in part on the at least one additional reference location to direct the at least one additional radio frequency signal to the at least one additional target area.

11. The network node of claim 10, wherein the sub-panel corresponds to a first location on the antenna panel and the at least one additional sub-panel corresponds to a second location on the antenna panel, wherein the first location and the second location are separated.

12. The network node of claim 1, wherein the virtual image corresponds to a point spread function associated with an aperture of an antenna panel of the network node.

13. The network node of claim 1, wherein the one or more processors, to transmit the radio frequency signal, are configured to transmit the radio frequency signal using only a mode 0 of an orbital angular momentum antenna array.

14. The network node of claim 1, wherein the one or more processors, to transmit the radio frequency signal, are configured to transmit the radio frequency signal using an antenna element of an antenna system having an antenna panel, that includes the antenna element, and a first lens, wherein the target area is associated with an additional network node having a second lens, and wherein the antenna element is located outside of a focal length of the first lens.

15. The network node of claim 14, wherein the virtual image is located between the first lens and a convergence point that corresponds to a real image that is located within a focal length of the second lens.

16. The network node of claim 1, wherein the one or more processors, to transmit the radio frequency signal, are configured to transmit the radio frequency signal using an antenna element of an antenna system having an antenna panel, that includes the antenna element, and a lens, and wherein the reference location is displaced from the antenna element in a direction opposite a direction of transmission.

17. The network node of claim 1, wherein the one or more processors, to transmit the radio frequency signal, are configured to transmit the radio frequency signal using an antenna system having an antenna panel and a reflector array, and wherein the one or more processors, to beamform the radio frequency signal, are configured to adjust a phase of a reflector element of the reflector array.

18. The network node of claim 1, wherein the radio frequency signal comprises at least one of a system broadcast signal, a synchronization signal, or a reference signal.

19. A network node for wireless communication, comprising:
a first lens;
a memory; and
one or more processors, coupled to the memory, configured to:
determine a location associated with a real image corresponding to a virtual image that corresponds to a target area; and
receive a radio frequency signal using a reception beam that is beamformed based at least in part on the location.

20. The network node of claim 19, wherein the real image is located within a focal length of the second lens.

21. The network node of claim 19, wherein the one or more processors, to receive the radio frequency signal, are configured to receive the radio frequency signal using an antenna element of an antenna system having an antenna panel, that includes the antenna element and the lens.

22. The network node of claim 19, wherein the one or more processors, to receive the radio frequency signal, are configured to beamform the radio frequency signal based at least in part on at least one of a phase adjustment corresponding to an antenna element of a phased array or a geometric configuration of the lens.

23. A method of wireless communication performed by a network node, comprising:
determining a reference location associated with a virtual image corresponding to a target area; and
transmitting a radio frequency signal, wherein the radio frequency signal is beamformed based at least in part on the reference location to direct the radio frequency signal to the target area.

24. The method of claim 23, wherein the virtual image comprises a virtual point source for the radio frequency signal.

25. The method of claim 23, wherein the network node includes an antenna system having a multiple input multiple output (MIMO) configuration.

26. The method of claim 23, wherein the reference location is based at least in part on a range associated with the target area.

27. A method of wireless communication performed by a network node having a lens, comprising:

determining a location associated with a real image corresponding to a virtual image that corresponds to a target area; and receiving a radio frequency signal using a reception beam that is beamformed based at least in part on the location.

28. The method of claim 27, wherein the real image is located within a focal length of the second lens.

29. The method of claim 27, wherein receiving the radio frequency signal comprises receiving the radio frequency signal using an antenna element of an antenna system having an antenna panel, that includes the antenna element and the lens.

30. The method of claim 27, wherein receiving the radio frequency signal comprises beamforming the radio frequency signal based at least in part on at least one of a phase adjustment corresponding to an antenna element of a phased array or a geometric configuration of the lens.

* * * * *